United States Patent [19]

Kohlrausch et al.

[11] Patent Number: 5,498,437

[45] Date of Patent: Mar. 12, 1996

[54] PROCESS FOR THE REMOVAL OF CHOLESTEROL DERIVATIVES FROM EGG YOLK

[75] Inventors: Utz Kohlrausch, Trostberg; Jan Cully, Garching; Bruno Schmid, Engelsberg, all of Germany

[73] Assignee: SKW Trostberg, Trostberg, Germany

[21] Appl. No.: 296,095

[22] Filed: Aug. 25, 1994

Related U.S. Application Data

[63] Continuation of Ser. No. 106,545, Aug. 16, 1993, abandoned.

[30] Foreign Application Priority Data

Apr. 28, 1993 [DE] Germany ............ 43 13 919.1

[51] Int. Cl.$^6$ .................................................. A23L 1/32
[52] U.S. Cl. ........................ 426/614; 426/422; 426/442
[58] Field of Search .................................. 426/614, 422, 426/412, 490, 442, 431; 554/212

[56] References Cited

U.S. PATENT DOCUMENTS

| | | | |
|---|---|---|---|
| 4,880,573 | 11/1989 | Courregelongue et al. | 426/417 |
| 5,045,242 | 9/1991 | Roczniak et al. | 426/586 |
| 5,063,077 | 11/1991 | Vollbrecht et al. | 426/614 |
| 5,223,295 | 6/1993 | Maffrand et al. | 426/614 |
| 5,232,725 | 8/1993 | Roderbourg et al. | 426/422 |
| 5,264,226 | 11/1993 | Graille et al. | 426/422 |
| 5,264,241 | 11/1993 | Graille et al. | 426/422 |

FOREIGN PATENT DOCUMENTS

| | | | |
|---|---|---|---|
| 454099 | 10/1991 | European Pat. Off. | 426/614 |
| WO-91/11114 | 8/1991 | WIPO | 426/614 |

*Primary Examiner*—Anthony J. Weier
*Attorney, Agent, or Firm*—Felfe & Lynch

[57] ABSTRACT

In a process for the removal of cholesterol and cholesterol esters from egg yolk, the egg yolk is diluted with an aqueous solution of a water-soluble salt of the cation potassium or/and calcium as well as the anion chloride and/or sulfate or/and an organic anion with a molecular weight of $\leq 150$. The diluted egg yolk is subsequently mixed with β-cyclodextrin until complexation of cholesterol and cholesterol esters with β-cyclodextrin has taken place. The formed complexes are separated and after separation of the complexes from the egg yolk mixture the added salt as well as, if desired, water is removed again. Low sodium egg yolk products with a low total cholesterol content and good sensorial properties are obtained.

20 Claims, No Drawings

PROCESS FOR THE REMOVAL OF CHOLESTEROL DERIVATIVES FROM EGG YOLK

This application is a continuation of application, Ser. No. 08/106,545, filed Aug. 16, 1993 now abandoned.

BACKGROUND OF THE INVENTION

The invention is in a process for the removal of cholesterol and cholesterol esters from egg yolk with the aid of β-cyclodextrin as a complexing agent. Cholesterol and cholesterol esters, denoted cholesterol derivatives in the following, are lipophilic substances which occur in numerous foodstuffs of animal origin such as e.g. egg yolk, meat, animal fats etc.

The intake of very large amounts of cholesterol derivatives through the diet is known to represent an increased risk factor for arteriosclerosis or coronary heart disease. For this reason the food industry is interested in significantly reducing cholesterol derivatives in high-fat foodstuffs of animal origin. A fundamental problem in this is to preserve the sensorial and nutritional physiological properties of the foodstuffs to a large extent.

A number of processes for isolating cholesterol derivatives is already known; however, these processes are, unsuitable for reducing the content of cholesterol derivatives in foodstuffs because undesired changes in these properties occur which are due to chemical changes in important constituents of the starting material (such as e.g. proteins, triglycerides etc.).

A relatively mild process which has only recently become known uses $CO_2$ high pressure extraction to remove cholesterol derivatives (cf. V. Krukonis, Supercritical Fluid Processing, International Symposium on Supercritical Fluids, Nice, 1988, and A. Bude and D. Knorr, Reduction of Cholesterol in Egg Powder and Whole Eggs by Extraction with Supercritical Carbon Dioxide, Fifth International Congress on Engineering and Food, Cologne, 1989).

These processes are distinguished by the physiological harmlessness of the extraction agent ($CO_2$), working at high pressure is however, technically quite complicated. In addition these processes do not allow cholesterol derivatives to be selectively removed under mild conditions because triglycerides are also extracted.

Selectivity can in principle be improved by increasing the temperature but this has a negative effect on the loading of $CO_2$ with cholesterol derivatives and on the quality of the product obtained.

Another known process for removing cholesterol derivatives is the complexation of these substances with β-cyclodextrin. Thus according to EP-A 0 326 469 egg yolk powder is for example stirred with β-cyclodextrin for 5 hours at 40° C. after its homogenization with water and the complex obtained is separated by centrifugation, However, the cholesterol contents may only be reduced to a maximum of 74% of the initial value in this way.

A significant improvement with regard to reducing cholesterol is possible according to the process of DE-OS 39 28 258 in which only the egg yolk plasma fraction, which can be obtained from egg yolk using a demulsifying agent such as e.g. water after centrifuging the LDL granular fraction, is admixed with β-cyclodextrin and not the entire egg yolk. Subsequently the egg yolk plasma treated in this way is again combined with the LDL granular fraction after separating the β-cyclodextrin and its complexes.

However, in some cases it is difficult to separate the egg yolk plasma fraction from the LDL granular fraction and from the β-cyclodextrin cholesterol complex. In order to solve this problem it was proposed in DE-OS 40 13 367 as well as WO 91/11 114 to admix the egg yolk with a diluted aqueous solution of ammonium carbonate or sodium chloride before the complexation step with β-cyclodextrin in order to prevent the emulsion breaking down and precipitation of the LDL granular fraction.

A disadvantage of this process is however, the fact that it is very difficult to completely remove the added salts from the egg yolk mixture. Apart from the fact that for this reason the process soon becomes uneconomical, the reduced-cholesterol egg yolk products produced in this way usually have a higher content of sodium or ammonium ions which is undesirable with regard to nutritional physiology.

THE INVENTION

The object of the present invention is therefore to provide a process for the removal of cholesterol derivatives from egg yolk by diluting the egg yolk with an aqueous salt solution and subsequently to complex the cholesterol derivatives with the aid of β-cyclodextrin which does not have the aforementioned disadvantages of the state of the art but rather enables a substantially selective, technically uncomplicated reduction of cholesterol derivatives and in which the egg yolk products with reduced cholesterol do not have an increased sodium content after processing.

This object is achieved according to the present invention by diluting egg yolk with an aqueous solution of a water-soluble salt consisting of the cation potassium or/and calcium as well as the anion chloride and/or sulfate or/and an organic anion with a molecular weight of ≦150 before the complexation step, then mixing the diluted egg yolk with β-cyclodextrin until complex formation has taken place, separating the complexes and after separating the complexes from the egg yolk mixture removing the added salt again as well as, if desired, the water.

Surprisingly it has been found that instead of sodium salts the aforementioned other salts effectively prevent demulsification of the egg yolk and in addition do not have to be completely removed from the egg yolk which has especial economic advantages. Moreover low-sodium, egg yolk products with a low total cholesterol content and good sensorial properties are obtained in this way which, also because of their partially increased calcium content, are regarded as particularly attractive with regard to nutritional physiology.

In the process of the present invention, initially a diluted egg yolk mixture is produced by addition of an aqueous solution of a particular water-soluble salt whereby this addition prevents breaking of the emulsion and formation of a LDL granular fraction. Potassium or/and calcium chloride, potassium sulfate or potassium and/or calcium salts of organic anions which have a molecular weight of ≦150, preferably of ≦100 come into consideration as the water-soluble salts. Suitable organic salts are those which are safe with regard to nutritional physiology. Salts with the anions acetate or lactate are thus particularly suitable. Thus potassium or/and calcium acetate and potassium lactate are particularly preferred.

The amount of the respective salt solution can be varied over a wide range. It has proven to be particularly advantageous to add the salt which is to be used so that it is present at a concentration of 1.0 to 6.0% by weight in relation to the total weight of the diluted egg yolk mixture. A salt concentration of 2.0 to 5.0% by weight in relation to the total weight of the diluted egg yolk mixture is particularly preferred.

The salt solution can be prepared before addition to the egg yolk or in situ by separate addition of water and the respective salt. When diluting the egg yolk with the aqueous solution the amount of water added is preferably 10 to 200% by weight, in particular 50 to 100% by weight in relation to the initial weight of the egg yolk.

After adding the salt solution complexation of the cholesterol derivatives takes place with the aid of β-cyclodextrin which enables a particularly selective separation of the cholesterol derivatives. The amount of complexing agent added can also be varied over a wide range, however, 3–40% by weight β-cyclodextrin in relation to the dry weight of the egg yolk are preferably used. About 80 to 95% of the cholesterol derivatives are removed during this complexation which can be carried out according to well-known methods such as e.g. by simple mixing or stirring, while the remaining egg yolk constituents remain largely in the liquid phase. The complexation step can be carried out at room temperature; however, due to the improved storage stability of egg yolk products the processing is preferably carried out at a temperature reduced to 0° to 10° C.

After complexation the formed cholesterol derivative complex is separated from the liquid egg yolk mixture. The usual technological processes and methods can be used to accomplish the separation. Centrifugation is preferred because of the rapid and complete separation.

It is essential for the present invention that for reasons of flavour and quality one removes the added salts again or at least a major amount thereof and if desired, the water after the β-cyclodextrin treatment and separation of the complexes. The salts are preferably separated from the egg yolk by means of ultrafiltration and/or electrodialysis. If desired, water can be removed completely or partially at the same time or separately for example by simple spray drying or vacuum treatment. In this way, depending on the degree of dryness, a low sodium liquid egg or egg yolk powder with a total cholesterol content reduced by about 80 to 95% and good sensorial qualities is obtained.

The following examples further elucidate the invention.

EXAMPLE 1

0.5 kg egg yolk (dry weight 238 g) with a cholesterol content of 1.2% by weight was admixed with 0.5 kg 5% by weight of an aqueous potassium chloride solution. Subsequently 70 g β-cyclodextrin was added to the egg yolk-salt-water mixture and stirred for 60 minutes at 10° C. in order to form complexes. Afterwards the β-cyclodextrin complex was separated from the egg yolk plasma phase by centrifugation. In the next step the moisture content was again adjusted to the initial value of the egg yolk and the potassium content was reduced to ca. 0.06% by weight (natural content 0.108% to 0.155%) by simultaneous cross-flow ultrafiltration and electrodialysis.

An egg yolk was obtained as the product which had a cholesterol content of 0.18% by weight which corresponds to a cholesterol reduction of 85% (relative to untreated egg yolk).

EXAMPLE 2

0.5 kg egg yolk (dry weight 238 g) with a cholesterol content of 1.2% by weight was admixed with 0.5 kg of an aqueous salt solution consisting of 2.5% by weight calcium chloride and 2.5% by weight potassium chloride. Subsequently 70 g β-cyclodextrin was added to the egg yolk-salt-water mixture and stirred for 60 minutes at 10° C. Afterwards the β-cyclodextrin complexed with cholesterol derivatives was separated from the egg yolk plasma phase by centrifugation. In the next step the moisture content was again adjusted to the initial value of the egg yolk and the calcium content was lowered to ca. 0.16% by weight (natural content 0.131% to 0.147%) and the potassium content was lowered to ca. 0.013% (natural content 0.108% to 0.155%) by vacuum evaporation and electrodialysis.

An egg yolk was obtained as the product which had a cholesterol content of 0.19% by weight which corresponds to a cholesterol reduction of 84% (relative to untreated egg yolk).

EXAMPLE 3

0.5 kg egg yolk (dry weight 238 g) with a cholesterol content of 1.2% by weight was admixed with 0.5 kg of an aqueous 5% by weight calcium chloride solution. Subsequently 70 g β-cyclodextrin was added to the egg yolk-salt-water mixture and stirred for 60 minutes at 10° C. Afterwards the β-cyclodextrin complex was separated from the egg yolk plasma phase by centrifugation. In the next step the moisture content was again adjusted to the initial value of the egg yolk and the calcium content was reduced to ca. 0.58% by weight (natural content 0.131% to 0.147%) by means of vacuum evaporation and electrodialysis.

An egg yolk was obtained as the product which had a cholesterol content of 0.18% by weight which corresponds to a cholesterol reduction of 85% (relative to untreated egg yolk).

EXAMPLE 4

0.5 kg egg yolk (dry weight 238 g) having a cholesterol content of 1.2% by weight was admixed with 0.5 kg of an aqueous salt solution consisting of 1.67% calcium chloride and 3.33% by weight potassium chloride. Subsequently 70 g β-cyclodextrin was added to the egg yolk-salt-water mixture and stirred for 60 minutes at 10° C. Afterwards the β-cyclodextrin complex was separated from the egg yolk plasma phase by centrifugation. In the next step the moisture content was again adjusted to the initial value of the egg yolk and the calcium content was lowered to ca. 0.21% by weight (natural content 0.131% to 0.147%) and the potassium content was decreased to ca. 0.134% (natural content 0.108% to 0.155%) by means of vacuum evaporation and electrodialysis.

An egg yolk was obtained as the product which had a cholesterol content of 0.20% by weight which corresponds to a cholesterol reduction of 83% (relative to untreated egg yolk).

EXAMPLE 5

0.5 kg egg yolk (dry weight 238 g) having a cholesterol content of 1.2% by weight was admixed with 0.5 kg of an aqueous 5.6% by weight calcium acetate solution. Subsequently 70 g β-cyclodextrin was added to the egg yolk-salt-water mixture and stirred for 60 minutes at 10° C. Afterwards the β-cyclodextrin complex was separated from the egg yolk plasma phase by centrifugation. In the next step the moisture content was again adjusted to the initial value of the egg yolk and the calcium content was reduced to ca. 0.5% by weight (natural content 0.131% to 0.147%) by simultaneous cross-flow ultrafiltration and electrodialysis.

An egg yolk was obtained as the product which had a cholesterol content of 0.1% by weight which corresponds to a cholesterol reduction of 92% (relative to untreated egg yolk).

EXAMPLE 6

0.5 kg egg yolk (dry weight 238 g) having a cholesterol content of 1.2% by weight was admixed with 0.5 kg of an aqueous salt solution consisting of 2.5% calcium acetate and 3.3% potassium chloride. Subsequently 70 g β-cyclodextrin was added to this mixture and stirred for 60 minutes at 10° C. Afterwards the β-cyclodextrin complex was separated from the egg yolk plasma phase by centrifugation. In the next step the moisture content was again adjusted to the initial value of the egg yolk and the calcium content was reduced to ca. 0.26% by weight (natural content 0.131% to 0.147%) and the potassium content was lowered to ca. 0.1% by weight (natural content 0.108% to 0.155%) by means of vacuum evaporation and electrodialysis.

An egg yolk was obtained as the product which had a cholesterol content of 0.16% by weight which corresponds to a cholesterol reduction of 87% (relative to untreated egg yolk).

EXAMPLE 7

0.5 kg egg yolk (dry weight 238 g) having a cholesterol content of 1.2% by weight was admixed with 0.5 kg of an aqueous 10% by weight potassium lactate solution. Subsequently 70 g β-cyclodextrin was added to the egg yolk-salt-water mixture and stirred for 60 minutes at 10° C. Afterwards the β-cyclodextrin complex was separated from the egg yolk plasma phase by centrifugation. In the next step the moisture content was again adjusted to the initial value of the egg yolk and the potassium content was reduced to ca. 0.47% by weight (natural content 0.108% to 0.155%) by simultaneous cross-flow ultrafiltration and electrodialysis.

An egg yolk was obtained as the product which had a cholesterol content of 0.13% by weight which corresponds to a cholesterol reduction of 89% (relative to untreated egg yolk).

EXAMPLE 8

0.5 kg egg yolk (dry weight 238 g) having a cholesterol content of 1.2% by weight was admixed with 0.5 kg of an aqueous 10% by weight potassium acetate solution. Subsequently 70 g β-cyclodextrin was added to the egg yolk-salt-water mixture and stirred for 60 minutes at 10° C. Afterwards the β-cyclodextrin complex was separated from the egg yolk plasma phase by centrifugation. In the next step the moisture content was again adjusted to the initial value of the egg yolk and the potassium content was reduced to ca. 0.51% by weight (natural content 0.108% to 0.155%) by simultaneous cross-flow ultrafiltration and electrodialysis.

An egg yolk was obtained as the product which had a cholesterol content of 0.11% by weight which corresponds to a cholesterol reduction of 91% (relative to untreated egg yolk).

It will be understood that the specification and examples are illustrative but not limitative of the present invention and that other embodiments within the spirit and scope of the invention will suggest themselves to those skilled in the art.

We claim:

1. A process for the removal of cholesterol and cholesterol esters from egg yolk comprising:

diluting the egg yolk with an aqueous solution of at least one water-soluble salt to form a diluted egg yolk wherein said least one water-soluble salt comprises at least one cation selected from the group consisting of potassium and calcium and at least one anion selected from the group consisting of chloride, sulfate and an organic anion having a molecular weight of $\leq 150$;

adding β-cyclodextrin to the diluted egg yolk to form a complex with the cholesterol and the cholesterol esters;

separating the formed complex from the egg yolk; and removing the added salt from the egg yolk.

2. The process of claim 1 further comprising removing the water subsequent to separating the one or more formed complexes.

3. The process of claim 1 wherein the salt is at least one selected from the group consisting of potassium acetate and calcium acetate.

4. The process of claim 1 wherein the salt is potassium lactate.

5. The process of claim 1 wherein the salt is added until the concentration of the added salt is 1.0 to 6.0% by weight relative to the total weight of the diluted egg yolk.

6. The process of claim 1 wherein the concentration of the added salt is adjusted to 2.0 to 5.0% by weight relative to the total weight of the diluted egg yolk.

7. The process of claim 1 wherein when diluting the egg yolk, water is added in an amount of 10 to 200% by weight relative to the initial weight of the egg yolk prior to dilution.

8. The process of claim 7 wherein the water is added in an amount of 50 to 100% by weight.

9. The process of claim 1 wherein β-cyclodextrin is added in an amount of 3 to 40% by weight in relation to the dry weight of the egg yolk.

10. The process of claim 1 wherein the forming of the complex is carried out at a temperature of 0° to 10° C.

11. The process of claim 1 wherein the separating step is by centrifuging.

12. The process of claim 1 wherein the salt is removed by ultrafiltration and electrodialysis.

13. The process of claim 1 wherein the water is removed by spray drying or a vacuum treatment.

14. A process for the removal of cholesterol and cholesterol esters from egg yolk comprising:

diluting the egg yolk with an aqueous solution of at least one water-soluble salt (thereby avoiding demulsification of the egg yolk) and forming a diluted egg yolk wherein said least one water-soluble salt comprises at least one cation selected from the group consisting of potassium and calcium and at least one anion selected from the group consisting of chloride, sulfate and an organic anion having a molecular weight of $\leq 150$;

adding β-cyclodextrin to the diluted egg yolk to form a complex with the cholesterol and the cholesterol esters;

separating the formed complex from the egg yolk; and removing the added salt from the egg yolk.

15. The process of claim 14 wherein the salt is at least one selected from the group consisting of potassium acetate and calcium acetate.

16. The process of claim 14 wherein the salt is potassium lactate.

17. The process of claim 14 wherein the salt is added until the concentration of the added salt is 1.0 to 6.0% by weight relative to the total weight of the diluted egg yolk.

18. The process of claim 14 wherein the concentration of the added salt is adjusted to 2.0 to 5.0% by weight relative to the total weight of the egg yolk.

19. The process of claim 14 wherein when diluting the egg yolk, water is added in an amount of 10 to 200% by weight relative to the initial weight of the egg yolk.

20. The process of claim 14 wherein β-cyclodextrin is added in an amount of 3 to 40% by weight in relation to the dry weight of the egg yolk.

* * * * *